Oct. 8, 1963   B. M. RANDALL ETAL   3,106,503
METHOD OF MAKING HONEYCOMB STRUCTURAL PANELS
Filed Sept. 9, 1959   2 Sheets-Sheet 1

Inventors
Boardman M. Randall
Ralph S. Frobisher
by James M. Heilman
Attorney

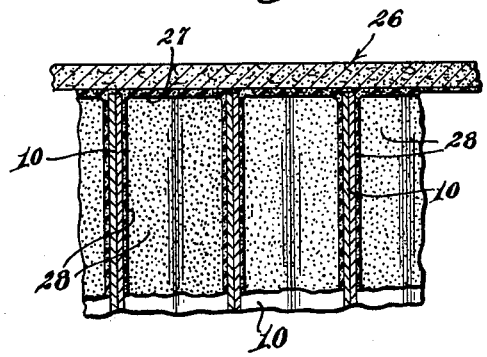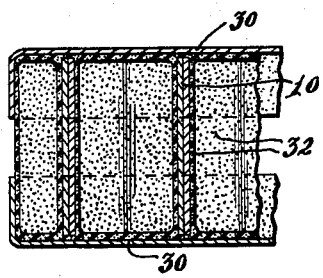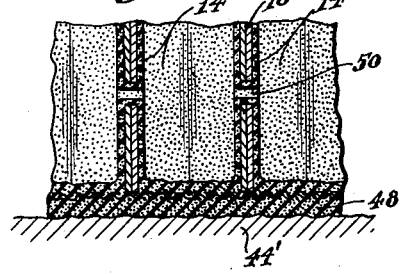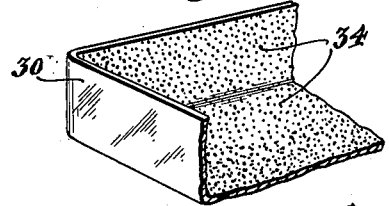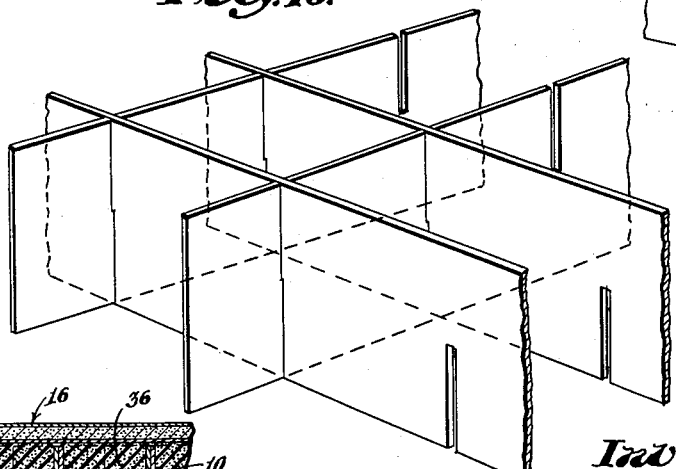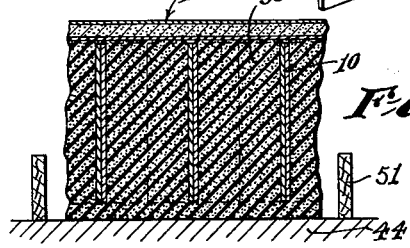

3,106,503
METHOD OF MAKING HONEYCOMB STRUCTURAL PANELS
Boardman M. Randall, Portsmouth, N.H., and Ralph S. Frobisher, Beach Hill Road, New Castle, N.H.
Filed Sept. 9, 1959, Ser. No. 838,911
20 Claims. (Cl. 156—290)

This invention relates to improvements in "honeycomb" structures or reticulated web structures and the process of manufacture of the general type suitable for use in structural panels. More particularly, the invention provides honeycombs or reticulated web structures which are highly fire and flame resistant and which have superior strength for resisting stresses and strains, as compared with prior comparable web structures. Actually the improved reticulated webs or honeycombs may be faced on one or both sides with conventional panel facing elements or skins to produce structural panels of exceptional strength and fire and flame resistance.

The improved web also may be utilized in various other ways as, for example, an acoustical media or as a light-reflecting fixture or media. In the latter case, the web would be used with no faces on either side and be positioned in front of the light source. Hence, it should be understood that the herein described embodiments of the invention in connection with panel facing elements or skins are merely illustrative of particular embodiments, and that the improved webs or honeycombs may be variously utilized with or without facing elements on either or both sides of the webs or honeycombs and with or without the cell spaces being filled in whole or part.

Honeycomb structures or reticulated web structures of the general type to which the invention relates have been made of treated paper and have constituted cores intervening between panel facing elements secured to opposite sides of the webs or honeycombs. Heretofore, however, the paper stock of the webs or honeycombs has been impregnated with resinous substances to impart needed stiffness and strength to the cores, and the resinous substances have made the webs or honeycombs suitably moisture resistant. However, the prior resin impregnated paper cores are highly inflammable, and the prior bonding agents for securing the facing elements to the cores required to be the same as or compatible with the resinous substance with which the cores are impregnated, have not been capable of withstanding flame. In addition, these resinous substances are, in general, toxic to human beings. Also, the use of resinous substances and adhesives, besides being expensive, create problems when the resin-impregnated cores must be bonded to various types of facing elements such as, for example, facing elements of metal, commercial asbestos-cement board, and commercial gypsum board.

It is among the objects of our present invention to provide a relatively inexpensive, pre-formed, reticulated paper web or honeycomb structure of small cells which can successfully and effectively withstand direct contact with flame, which may be moisture resistant, and which readily and effectively may be combined with any of the conventional panel facing elements or skins to provide a relatively inexpensive lightweight structural panel having superior qualities of rigidity and strength as compared with prior comparable panels, and having the important characteristic of being able to resist successfully the ravages of flame and high temperatures, and, irrespective of the temperature, to be always non-toxic.

Another object of the invention is to provide a reticulated paper web or honeycomb structure which is coated with relatively inexpensive cementitious non-toxic material and which may be effectively bonded to panel facing elements or skins by a cementitious bonding material which may be the same as or compatible with the coating material; the said cementitious material having the character that it sets and converts the paper web or honeycomb into a rigid and strong flame proof structure capable of bearing substantial loads.

A further object of the invention is to provide a reticulated web or honeycomb structure of small cells generally in the range of ¼" to ¾" made of paper, asbestos paper, or asbestos, which is capable of absorbing appreciable amounts of a cementitious material when the web or honeycomb structure is immersed in a suitably fluid supply of the cementitious material. This latter material also forms as a relatively hard and strong coating over all surfaces of the web or honeycomb whereby the coated web or honeycomb may be exposed preferably interiorly of a building as an acoustical medium and, when the coating is white or a suitably light color, may serve as a light-reflecting medium in connection with the lighting equipment within the building.

Yet another object of the invention is to provide a structural panel having a reticulated web core or honeycomb core secured to a facing element, or intervening between two facing elements and secured to both, by a cementitious material which also coats all surfaces of the reticulated web or honeycomb, the cementitious material being set to hardness to provide a strong panel which is highly fire and flame resistant.

Still another object of the invention is to provide a structural panel wherein a reticulated web or honeycomb of absorbent sheet material has a cementitious material strongly adhering to all of its surfaces and edges and set to hardness thereon, said cementitious material either filling all cells and voids within the web or honeycomb or adhering as a coating over said surfaces and edges, one or both sides of the web or honeycomb having means thereon constituting a facing for the panel.

Yet a further object of the invention is to provide a structural panel wherein a reticulated web or honeycomb of absorbent sheet material has a coating of cementitious material covering and strongly adhering to all surfaces and edges of the web or honeycomb, with a substantial body of the same cementitious material formed as a facing at one side or both sides of the coated web or honeycomb and self-bonded to the cementitious coating over the surfaces and edges of the web or honeycomb so that the coating on the web and the facing are merged as a unit.

A further object is to provide processes for making the above honeycomb structures and panels which processes utilize inexpensive equipment necessitating low capital investment, are simple to carry out, and can be done quickly utilizing unskilled labor.

A still further object is to provide methods for manufacturing which use a dipping operation to coat the core and an open box-like form to lay up the panels, thereby avoiding complicated impregnating machines and expensive hot or cold presses for setting the bonding material.

It is, moreover, our purpose and object generally to improve the structure and effectiveness of structural panels and method of manufacture and especially such panels having a reticulated web or honeycomb structure faced, or to be faced, on one or both sides with a panel facing element or skin.

With the foregoing and other objects in view, the invention resides in the novel arrangement and combination of parts and in the details of construction and process of manufacture herein described and claimed, it being understood that changes in the precise embodiment of the invention herein described may be made within the scope of what is claimed without departing from the spirit of the invention. It will be further understood that our invention is susceptible of embodiment in many and various forms, some of which are illustrated in the accompanying drawing, and that the structural details or particular procedures herein set forth may be varied to suit particular purposes and still remain within the inventive concept.

In the accompanying drawings:

FIG. 7 is a view similar to FIG. 6 but showing the improved coated web or honeycomb structure combined with another variety of facing element;

FIG. 8 is a cross-sectional view through a portion of another modification of the invention wherein the facing elements may be porcelain-on-metal pans applied to opposite sides of the improved reticulated core;

FIG. 9 is a perspective view of a corner fragment of one of the pans of FIG. 9, showing the interior of the pan roughened, as by sand blasting or by some other method;

FIG. 10 is a perspective view of a portion of a modified form of reticulated web structure which may be coated with cementitious material to provide a panel core in accordance with the teachings of our invention;

FIG. 11 is a cross-sectional view of a fragment of a modified form of panel wherein the cells and voids within a reticulated web or honeycomb are filled with cementitious material which strongly adheres to the walls of the web or honeycomb, and wherein one side is faced with a conventional panel facing element and the other side has cementitious material similar to that constituting the filler, formed thereon to constitute a panel facing, the forming support or forming die also being shown;

FIG. 12 is a detail cross-sectional perspective view of a fragment of the web or honeycomb of FIG. 11, notched to permit inter-connection of cementitious masses in adjacent cells or voids of the web or honeycomb; and FIG. 13 is a cross-sectional view of a fragment of another modified form of panel wherein a web or honeycomb coated with cementitious material has a mass of cementitious material formed on one side thereof for constituting a panel facing, which panel facing penetrates into the web for a limited distance for additional strength, the forming support or embossing die also being shown.

Figure 1:
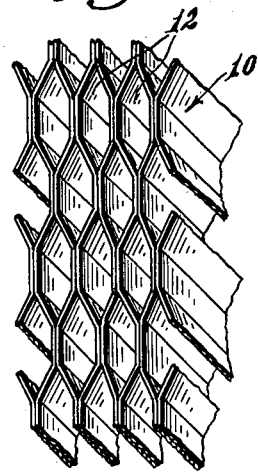
FIG. 1 is a perspective view of a fragment of a partially opened recticulated web or honeycomb structure of paper, fabric or other suitable material which may be coated with cementitious material in accordance with the teachings of our invention.

Referring to the drawings, a fragment of a commercially available variety of a reticulated paper web or honeycomb structure 10 is represented in FIG. 1, in a partially opened state. It should be understood that the invention is not restricted to any particular material or variety of reticulated web structure so long as it is of a more or less absorbent sheet material organized to provide a multiplicity of air spaces or cells 12 therein, generally in the range of ¼" to ¾" in diameter. Paper is preferred because it is cheaper than fabrics, cloths, and other materials. The reticulated web or honeycomb structure 10 of FIG. 1 is available commercially in compacted strips of any desired width, which may be drawn out to provide the partially opened honeycomb structure of FIG. 1 and in fully opened coated condition in FIG. 2.

Heretofore paper honeycomb structures destined for use in structural panels have employed paper stock impregnated with relatively expensive resinous substances which contribute needed stiffness and strength to the cellular walls of the honeycomb structure and also render the structure suitably moisture resistant. Such a resin impregnated paper honeycomb structure, when faced with conventional panel facing elements or skins, has been satisfactorily useable as a structural panel where moisture resistance has been a primary requirement. But these prior panels could be, in no practical sense, fire and flame resistant, or effectively resistant to high temperatures. The reason is that in treating the paper honeycomb structures to provide them with needed stiffness and strength and moisture resistance, they have been rendered highly inflammable, and the required bonding agents for bonding the honeycomb core structures and the facing elements or skins are also highly inflammable.

The present invention employs reticulated webs or honeycombs of relatively low cost sheet material which preferably is substantially free of resins and sizing substances, so that the sheet stock is in condition to absorb, or be penetrated by, a fluid cementitious substance, at least to a substantial degree. The honeycomb structure may be immersed in such a fluid cementitious material to thoroughly coat all exposed surfaces of the honeycomb structure, with the cementitious substance entering appreciably into the sheet stock for effecting a secure bond between the sheet stock and the coating when the cementitious material sets and ultimately dries. While dipping the honeycomb structure directly into the fluid cementitious material is preferred, spraying or any other means of applying the coating may be used. The only consideration is that the cementitious material must thoroughly coat the entire area of the honeycomb.

Paper stock which is substantially free of sizing substances and resins is considered to be a preferred sheet material from which to form the reticulated webs or honeycombs for use in the improved structural panels. The paper honeycomb structure, as represented at 10 in FIG. 1, may be purchased with its paper stock free, or substantially free, of resins and sizing substances, and such a paper honeycomb of suitable width, and of suitable area when fully expanded, has proven to be a highly acceptable reticulated web or honeycomb structure capable of being effectively coated with a cementitious material and effectively combined with any of a variety of panel facing elements or skins in accordance with teachings of this invention.

Examples of cementitious coating materials suitable for use in producing both the improved reticulated webs or honeycombs and the improved structural panels are Portland cement, gypsum plaster, Keene's cement, and other comparable relatively low cost cementitious materials of the class which may be more particularly described as mineral hydraulic cementitious materials.

Portland cement, reduced by addition of water to a suitable consistency, is regarded as a preferred cementitious material for coating the reticulated web or honeycomb structures of panels which must be highly moisture resistant as well as highly flame and heat resistant, such as panels which will be exposed to the elements at exterior portions of buildings. Usually, addition of a relatively small amount of an accelerator or a retarder will be advisable, for suitably controlling the setting of the Portland cement.

On the other hand, a water and gypsum plaster, of suitable consistency, is considered to be a preferred cementitious material for coating the reticulated web or honeycomb structures of panels which are not required to be highly moisture resistant, such as panels for use interiorly of buildings. Here again, an acceleraotr or retarder may be added to the plaster to suitably control its setting.

Either the Portland cement or the gypsum plaster, when coated on the reticulated web or honeycomb structure 10, as at 14 in FIGS. 2–8, render the web or honeycomb structure highly heat resistant and substantially flameproof. When Portland cement is used, the coated structure is also highly moisture resistant. Commercial "magnesite," and silicate of soda combined with calcium carbonate or whiting, are other materials falling within the general class of mineral hydraulic cementitious materials which may be used for coating the reticulated web or honeycomb structures.

The prior, somewhat comparable, structural panels which have employed resin impregnated paper honeycomb structures between panel facing elements have, to a considerable extent, been limited as to the varieties of facing elements which could be effectively combined with the honeycomb structures or cores. Problems have been involved to effectively and to durably bond the facing elements to certain varieties of conventional panel facing elements. It is a notable feature and advantage of the present coated web or honeycomb structures that they are able to be effectively and durably bonded to any of the conventional varieties of panel facing elements by means of a bonding material of the same as, or compatible with, the coating material.

Figure 5:
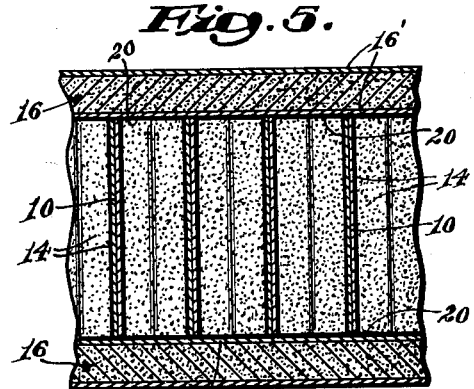
FIG. 5 is a cross-sectional view on line 5—5 of FIG. 4, on a larger scale.
Figures 4, 6:
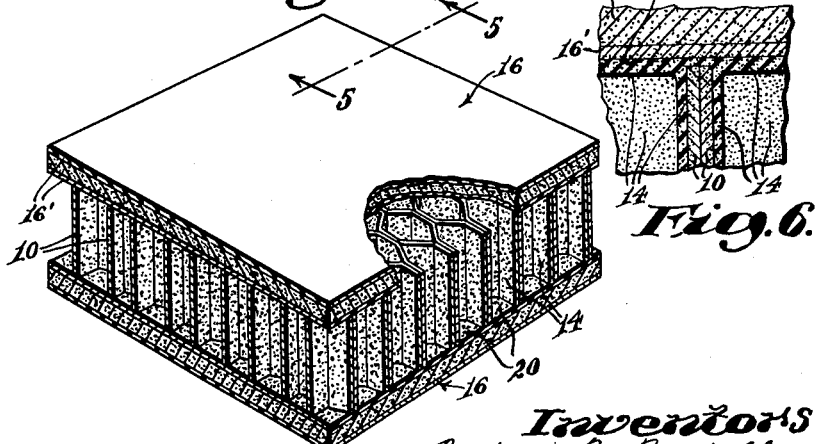
FIG. 4 is an isometric view of a section of a completed structural panel embodying features of the invention, with a portion of one of the facing elements broken away.
FIG. 6 is a detail view of a fragment of the panel of FIG. 5 on a still larger scale.

Referring to FIGS. 4–6, the facing elements 16 represent sections of commercial plaster or gypsum board. Each of the facing elements or boards are of a commercial variety which is surfaced on both sides with paper 16'. The cementitious coating 14 on the web or honeycomb structure 10 may be either gypsum plaster, Portland cement or the like. Assuming that it is gypsum plaster, each facing element 16 will be coated on one side at 20 with gypsum plaster, or a cementitious substance compatible therewith, prior to applying the facing elements 16 to the coated honeycomb.

The preferred process for making one form of the structural panel is to take one of the facing elements 16, place the element in a shallow open form or box 51 and coat the facing element on one side as at 20, similar to spreading butter on bread. The web or honeycomb structure after being immersed in the fluid cementitious material as mentioned before is coated, or actually is after-coated since the honeycomb or web has been previously formed to its initial stripe-bonded condition. The absorption of the fluid cementitious material into the paper softens the somewhat stiff paper web so that if the honeycomb is not fully spread or opened, it may be fully opened as it is arranged on element 16. This, of course, must be done while the fluid coating continues in a plastic condition. Subsequently, the web is pressed against element facing 16 in the box or form, with the walls of the honeycomb perpendicular to the element 16, so that their plastic coatings merge as in FIG. 6. The second facing element 16 may now be placed on the coated honeycomb in the form or box and its upper side covered or buttered with a compatible cementitious material. The second facing element is now turned over so that its coated side will lie against the coated honeycomb core, and is pressed tightly against it so that the coatings on the honeycomb core and the element will merge so as to appear to be a single coating. Obviously, both the first facing element and the second facing element may be buttered outside the form and then placed in the form for laying-up. This procedure eliminates the necessity for removing the second facing element from the honeycomb core, turning it over and replacing it permanently on the core.

The assembled panels may be stacked one upon another and be left to air dry in the atmosphere, or they may be subjected, according to known procedures, to conditions for hastening a complete curing and drying of the panels. Note that various accelerating or retarding agents may be added to affect the setting of the coatings as mentioned before. The complete laminated panels are exceptionally well suited for interior and exterior portions of buildings, and for other uses, where it may be important to have flame-proof and highly fire and heat resistant panelling while at the same time providing great strength and rigidity at relatively low cost.

FIG. 7 illustrates a panel structure which is faced on at least one side with a commercially available variety of asbestos cement board 26. In this case the reticulated paper web or honeycomb 10 is coated with Portland cement 28 and that surface 27 of the board 26 which is toward the coated web or honeycomb is coated with Portland cement, or a mineral hydraulic cementitious substance compatible with Portland cement. The other side of the reticulated web 10 of the panel of FIG. 7 may be similarly faced with an asbestos cement board 26, or this other side may be faced with a gypsum plaster board similar to the plaster boards 16 of FIGS. 4–6, or with some other facing element, such as a porcelain enameled steel facing element. For example, a panel may be assembled having one side faced with asbestos cement board, for exposure to the elements exteriorly of a building, and having its other side faced with gypsum plaster board, for inside exposure where moisture resistance is not of great consequence. The Portland cement provides an effective durable bond to both an asbestos cement board and a gypsum plaster board, and the resulting panel will be flame-proof and highly resistant to heat, and will have great strength, whether one or both of its faces is of asbestos cement board. The face which is of asbestos cement board, as well as the coated core, will be highly moisture resistant.

The panel represented in FIG. 8 has a porcelain enameled steel pan type of facing elements 30 combined with a coated reticulated web or honeycomb 10 whose coating material 32 may be Portland cement, gypsum plaster, or a comparable mineral hydraulic cementitious material.

Panels to be exposed exteriorly to the elements preferably should have cores coated with Portland cement and should be bonded to the facing elements by Portland cement. Gypsum plaster coated and bonded cores may be employed when the panels are not required to be highly moisture resistant. However, it should be understood that one of the facing elements of FIG. 8 might be replaced by an asbestos cement board similar to the board 26 of FIG. 7, or a gypsum plaster board similar to the boards 16 of FIGS. 4–6, or by some other facing element.

The porcelain enameled steel facing elements 30 are required to have their interior surfaces porous, or roughened to enable the cementitious coating and bonding material to acquire a secure grip thereon. The stippling at 34 in FIG. 9 represents such porous or roughened surfaces to which either Portland cement or gypsum plaster will effectively bond. The selection as between Portland cement or gypsum plaster will depend upon whether one facing element is an asbestos cement board or a gypsum plaster board, and the requirements as regards moisture resistance in the finished panel.

Other varieties of reticulated paper webs or honeycombs than that of FIG. 1 may be employed in practicing our invention. For example, an egg-crate type of reticulated paper web as represented in FIG. 10 may be coated with a mineral hydraulic cementitious material, as described in connection with the honeycomb structure 10, and be combined with facing elements or skins to produce panels similar to the panels of FIGS. 4–8. However, for excellent strength characteristics, the spacings of the cell walls or cross-sectional area of the cells should be relatively small.

Referring now to FIG. 11, the illustrated reticulated web or honeycomb 10 may be the absorbent paper structure of FIG. 1 but in this modification the paper is not coated. Instead the cells or voids are entirely filled with mineral hydraulic cementitious material 36 which, preferably, is gypsum plaster but which may be asbestos cement. While mineral hydraulic cementitious material is preferable for ease of manufacture and cheapness, obviously perlite, rock wool or other sound and heat insulating materials may be used depending upon the particular use of the material. Inasmuch as the reticulated paper web is absorbent, substantial amounts of the cementitious material, when in a suitably fluid state, penetrate into the paper of the web. Hence, when the cementitious material has set, a relatively strong bond exists between the cementitious material and the paper web 10. This filled reticulated web may have a conventional variety of facing element or skin applied to one or both sides thereof, or the facing at one or both sides may be formed integrally on the web as a single step process during the filling procedure.

In FIG. 11, a conventional paper-faced commercial plaster board facing element 16, similar to those employed in the panels of FIGS. 4–6, is applied to the upper side of the panel. Preferably this facing element 16 will be coated on its under side with the same cementitious material which is used to fill the web, or a cementitious material compatible therewith, so that the coating material and the filler material merge to provide an effective and strong bond. The facing element 16 may be applied while the web filler is in a more or less fluid state; or, if the filler has set, the end portions may be coated with the bonding coating to attain an effective bond between the web and the facing element. If desired, the web may have notches or grooves 38 in its cell walls (see FIG. 12) whereby the cementitious material filling the web flows into the notches to effect locking and strengthening interconnections at 40 between the filler masses in adjacent cells of the web.

Both sides of the filled web or honeycomb of FIG. 11 may be similarly faced. However, as shown in FIG. 11, the lower side of the filled web or honeycomb 10 has a facing of mineral hydraulic cementitious material. The facing is formed thereon as a result of inserting the web or honeycomb into a suitable fluid body of the cementitious material and supporting the web therein in such a manner that the cementitious material which fills the cells of the web and the cementitious material which forms the lower facing on the web are continuous cementitious bodies. The under support or die 44 for the cementitious material may be plane, or may be variously formed or embossed to provide any of various ornamental or decorative surface effects on the outer surface of the lower facing of the panel. Obviously, the web may be filled at the time the lower facing of cementitious material is being formed thereon, or the filler cementitious material may be set or partially set within the web when the web is inserted into the facing cementitious material. In either case, the filler mass and the facing mass join to provide continuity of cementitious material within the cells and at the lower face of the panel.

Figure 2:
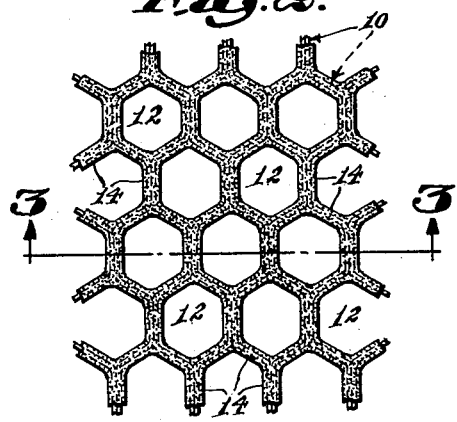
FIG. 2 is a plan view of the web or honeycomb of FIG. 1 in a fully open state and coated with a cementitious material.
Figure 3:
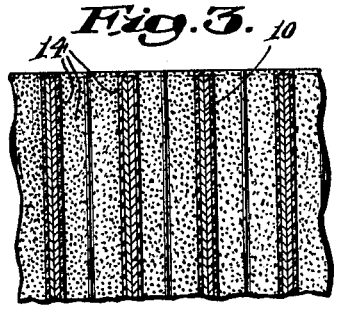
FIG. 3 is a cross-sectional view on line 3—3 of FIG. 2.

FIG. 13 illustrates another embodiment wherein a coated web or honeycomb, as shown in FIG. 2, has a facing formed thereon by inserting one side of the coated web or honeycomb a little into a fluid supply of mineral hydraulic cementitious material 48 whereby the cementitious material 48 engulfs or forms a facing on the panel substantially integral with the coating on the web or honeycomb. The material 48 enters a little into the cells, and a strong bond is effected. In FIG. 13, the support or die 44 has an embossed or otherwise decorative top surface whereby the surface of the facing formed on web 10 will be correspondingly embossed.

In any case where coated webs or honeycombs are faced on both sides to produce a panel, interior cross-ventilation for such panels may be provided, if desired, by preliminarily punching relatively large holes or openings through the cell walls of the paper web or honeycomb. These holes should be of size large enough so that they do not become closed as a result of the coating of the web. The punching may be accomplished while the walls of the cells of the paper web are closed flat against each other. Such holes are shown at 50 in FIG. 13, with their edges coated with the cementitious coating material, the same as the other edges of the web or honeycomb.

Obviously, one side of a panel may be faced as illustrated in FIG. 13, and the other side may be similarly faced or left without any facing. Or one side may be faced as in FIG. 13 and the other side may have a conventional facing element thereon, such as a plaster board facing element 16 as shown in FIGS. 4–6 and 11. The popular thickness of conventional plaster board or gypsum board is 3/8", but it is also available in 1/2" and 5/8". Also, it will be obvious that the formed facing of FIG. 13 may have a plane outer surface or an embossed outer surface.

The porcelain-on-metal pans illustrated in FIGS. 8 and 9 may be formed flat without any turned edges, i.e., as simple flat sheets in one plane. It is therefore clear that a simple flat type porcelain enamelled sheet or plate, with or without edge channel members, could be used instead of the pan type construction. If desired, the open cells of all the various constructions may be filled with perlite, rock wool or other non-combustible material for heat and sound insulation similar to that shown in FIG. 11.

It is, of course, clearly apparent that instead of using rigid panels of conventional paper faced gypsum, various types of flexible material (painted or unpainted) may be used as one or both faces, irrespective of whether they are the final faces or intermediate faces to which a final decorative face is to be secured. Among these flexible materials are ordinary paper, kraft paper, asbestos paper, and cloth of glass fiber, cotton or other types of fabrics. If kraft paper is used, Fourdrinier kraft paper from .008 to .016 caliper is preferred, while for glass fiber cloth a weave of 20 by 20 mesh is satisfactory. If desired, porcelain enameled pans or flat steel sheets may be laminated to the paper or glass fiber faces.

In columns 4 and 5 various types of mineral hydraulic cementitious materials are set forth such as ordinary Portland cement, gypsum plaster, Keene's cement, magnesite, silicate of soda combined with calcium carbonate, etc. Other examples of mineral binders are hydraulic slaked lime, ground unslaked lime, ground Portland cement klinkers, and special Portland cements such as: rapid hardening, early strength, or high initial strength Portland cement, high strength Portland cement, low heat, or slow hardening Portland cement, medium low heat Portland cement, sulphate resistant Portland cement, air entrained Portland cement, basic blast furnace slag, basic boiler slag, reactive fly ash, etc. Most of the above mentioned binders may be used alone or in combination with one another. Gypsum plaster, Keene's cement, and magnesite (native magnesium carbonate $MgCO_3$) are generally the equivalent of each other.

In columns 4, 6 and 7 and particularly column 5, there is broadly mentioned applicants' process. While there are many variations which may be used, the following ranges of ingredients have been found to be particularly desirable, 84 to 104 pounds of cement, 3/4 to 2 pounds of calcium chloride, and 10 to 13 gallons of water. The following details are used by applicants in making standard panels known as "Cell air Core" panels.

I. MIX

The cement dripping and coating mix consists of the following:

(A) 11 gallons of water, 1 pound calcium chloride, (CaCl), one 94-pound bag of fresh high early strength Portland cement. (In cool weather when the cement takes longer to obtain its initial set, more CaCl may be added, but in no case more than a total of 2 pounds of CaCl per 94-pound bag of cement.) The preferred range of the ingredients forming the coating is approximately between 84 to 104 lbs. of cement, ¾ to 2 lbs. of calcium chloride, and 10 to 13 gallons of water.

(B) The water is placed in the mixing tank first, CaCl is added and stirred until dissolved. Then the cement is added and the batch is stirred, preferably with a rake, until there are no residual lumps of unmixed cement and the mix has a uniform consistency similar to that of light cream.

II. HONEYCOMB (A) The paper honeycomb shall be standard grade 99(0) ¾ as made by Union Bag and Paper Company, Hudson Falls, New York, or equal. It has a ¾" cell size, is made from 99-pound (approximately .0095 caliper) kraft, with a density of approximately 1.6 pounds per cubic foot—expanded. The paper honeycomb should be obtained in blocks 22" long, 310–320 plies, and the caliper (thickness of block) of the desired finished core thickness.

III. PAPER FOR CORE FACES

The paper for core faces shall be Fourdrinier kraft paper not less than .008 caliper and not more than .016 caliper. Paper shall be cut into sheets 48" x 96", for example. The bottom sheet of paper shall be placed in position in each form before starting the actual operation of making cores.

IV. MAKING THE CORES (CELLairCORE)

(A) Expanding and soaking honeycomb: The partially expanded block of honeycomb is pulled open to a length of about 3', dunked in the mix and completely submerged. While submerged, the honeycomb block is completely expanded by stretching, making certain that the cement solution reaches all surfaces of the cells. At this point, the block should be somewhat over expanded, pulling the last few paper layers apart at each end of the block. The block is then laid on the drain board and lightly compressed, squeezing out the excess free cement solution. Since 3 blocks are required for a 48" wide core sheet, as soon as the first block is soaked and expanded the operator follows the same procedure with blocks 2 and 3.

(B) Coating the bottom sheet of paper is the form: At the same time that the man, i.e., called a "soaker," starts soaking and expanding the first honeycomb block, a second man takes approximately 2 quarts of the cement mix from the tank, pours this on the paper in the form and spreads it evenly over the paper surface using for this purpose a brush.

(C) Stretching the honeycomb: When all three blocks are soaked and the paper is brushed, the first block of honeycomb is taken from the drain board and stretched to full expansion. The block should be stretched to a length of approximately 9', one foot beyond its ultimate length, and then lowered into place on the bottom paper in the form. The expanded honeycomb is pushed over to the outside edge of the form, compressing the outside cells slightly along this edge so that a full width core is assured. As the block is laid in the form, approximately 2" of the last few paper layers at each end are bent around toward the center of the form at right angles so that the square corner of the form is filled with the honeycomb. The second and third blocks are then likewise stretched and placed in the form. When the form is filled with honeycomb, the honeycomb should be pushed or pulled one way or the other so that expansion of cells is uniform and there is a distinct overlapping of the half cells at the lengthwise joints between the expanded honeycomb blocks. This intermeshing between blocks is necessary to obtain maximum strength in the core by reducing the line of shear between the three lines of honeycomb.

(D) At this point if the core is to be open face, that is, for later filling with insulation, a plastic blanket, preferably .015" thick, is spread over the top surface of the core for keeping out extraneous matter.

(E) If the core is to be two faced, that is, paper on both surfaces, the top paper is applied at this point. The top paper is the same specification as the bottom paper. The top paper should be prefolded along the center of the long dimension. This folded sheet is laid on top of the expanded core in the form with the folded edge toward the center. One quart of a top cement mix, made up the same as the dipping mix but with ½ the proportion of water is spread evenly over the exposed surface of the folded paper. The paper shall, still folded, be lifted and turned through 180° and, with cement side down, is laid in position on the opposite half of the core, with the fold still toward the center. The newly exposed half of the top paper is now buttered with a second quart of the top cement mix. The paper is then unfolded and will now cover the entire core surface. The next empty form is then lifted and placed in position on top of the filled form, making certain that the sides and ends of the forms are closely lined up.

(F) The forms are then successively filled following the above outlined procedure until the stack is completed. The top press plate is then added, top beams placed on the stack, lined up with the bottom beams, clamps placed in position and tightened. Pressed stack of filled forms shall be left clamped under pressure overnight or longer.

V. REMOVING CORES FROM FORMS

Release the clamps, remove clamps, beams, and top press plate. Care must be exercised in handling green cores, as at this point the cement has only the initial set and is comparatively weak. Do not bend core. A sheet of plywood should be placed on top of the pile of green cores to prevent excess evaporation with resulting poor cure and warping. If the pile of green cores is in an area of excessive air movement or warmth the top and sides of the pile must be enclosed in some material, plastic sheets for example, which will prevent evaporation of moisture from the edges of the green cores.

VI. CURING THE CORES

At a temperature of 70° Fahrenheit the cores shall be left to cure for a minimum of 7 days. Lower temperature requires longer curing time while with higher temperatures the cure may be shortened. Curing suggestions for high early strength Portland cement are available from any cement manufacturer. Moisture must be retained in the cores during the curing cycle. For rapid cure of cement a cycle of high temperature plus high humidity in a closed room is available, but is not too economical for the particular purpose of curing cores. When the curing period is completed, the cores may be placed on stickers for final drying. Stickers, preferably wood, will go between the individual cores in a pile and separate the cores allowing air to pass over the core surfaces for drying. The top surface of the top core in the pile shall be covered to prevent uneven drying and consequent warping. When the cores are thoroughly dry they are ready for use.

If glass fiber cloth is used as a facing material for the core, in general the same procedure is followed. The glass fiber cloth preferably has a 20 by 20 mesh, and 12 gallons of water instead of 11 is used in the dipping and coating mix. No cement is brushed on either the bottom cloth face or the top cloth face. The top cloth face either in one or more pieces (overlapped slightly and unglued) is merely applied to the top of the wet honeycomb.

The core may be filled with insulation of various kind as, for example:

(A) Perlite, plaster aggregate size.

(B) Expanded vermiculite, untreated concrete aggregate size.

(C) Insulation grade as made by Monsanto Chemical Corporation.

Any excess insulation above the top surface of the cells is brushed off. The top of the cells must be exposed and clear of insulation particles.

VII. LAMINATION OF PANELS (A) If open face cores are used (that is, the cores do not have a top face of either paper or glass cloth) the open ends of the honeycomb cells shall be sanded so that any rough cement surface of these top cell ends will be knocked off.

(B) Adhesive on facing material is spread at the rate of approximately 1/3 gallon per 100 square feet of glue line, i.e., approximately the thickness of a normal wet coat of paint. The porcelain enamel pan or sheet, for example, is spread with a quantity of adhesive. The adhesive for the decorative face material preferably shall be either one of the adhesives made by Snyder Chemical Corporation, Bethel, Conn., or one of two special adhesives made by National Adhesive Co., Plainfield, N.J. If paper faced honeycomb core is used, and the core has been filled with insulation, the paper face is then applied to the adhesive on the inside of the porcelain sheet. The same quantity of adhesive is then spread on the surface of the paper. The porcelain face with adhered paper inside is then applied to the top surface of the core. A plywood caul is placed on top of the panel and the laminating process repeated with successive panels.

In core with glass fiber cloth face, the cloth is applied to the adhesive on the inside of the porcelain face. The adhesive from the pan face will penetrate through the meshes of the cloth and onto the tops of the honeycomb cells. Stack must be left under pressure at least overnight in warm weather. When the room temperature is lower than 50° overnight, the stack must be left clamped under pressure for at least 40 hours. Final cure may take from 10 to 30 days depending upon temperature. It is not until this time that the maximum ultimate strength of the adhesive is obtained.

(C) If the core has not been filled with insulation and, therefore, has been made up with two faces already applied, the back facing material, panel, sheet or pan of the panel is laminated as outlined in the above paragraph "B."

Many other modifications, improvements, and rearrangements are readily apparent.

This application is a continuation-in-part of applicants' parent "CellairCore" application, Serial No. 320,052, filed November 12, 1952, and issuing into Patent No. 2,910,396, dated October 27, 1959. Reference is also made to applicants' copending application, Serial No. 838,917, filed September 9, 1959 herewith.

What is claimed is:

1. The method of making a structural panel in which a facing element is placed in a form with its inside surface upwardly, coating said facing element with an adhesive material, immersing a normally stiff reticulated web in an adhesive material to coat practically all exposed surfaces of the web, at least some of said adhesive material being absorbed into and penetrating the web, fully opening the normally stiff web as it absorbs and is softened by the adhesive, positioning said fully opened web over substantially the entire length of the facing element, pressing the fully opened web against the facing element and forcing the coatings on the web and the facing element to merge, applying a similar adhesive material to the inside surface of a second facing element, and pressing said second facing element against the web while still within the form, and subsequently curing and drying the assembled structural panel.

2. The method as set forth in claim 1 using a fibrous material as the facing element.

3. The method as set forth in claim 1 in which the immersing of the web in an adhesive material consists of immersing in a fluid mineral hydraulic cementitious material.

4. The method as set forth in claim 3 in which the coating on at least one of said facing elements is a similar fluid mineral hydraulic cementitious material.

5. The method as set forth in claim 2 applying a sheet of porcelain enamel steel over the fibrous facing element.

6. The method of making a lightweight structural panel in which a flexible facing element is placed in a form with its inside surface upwardly, immersing a strip of normally stiff reticulated web in a fluid cementitious material to coat practically all exposed surfaces of the web, at least some of said fluid cementitious material being absorbed into and penetrating the web, fully opening the normally stiff web as it absorbs and is softened by the fluid cementitious material, positioning at least one strip of fully opened web over substantially the entire area of the facing element, said fully opened web having openings between the sides thereof, pressing the reticulated, fully opened web against the facing element and forcing the excess coating on the web to engulf the facing element, and pressing a second facing element against the reticulated web while still within the form, and subsequently curing and drying the assembled structural panel.

7. The method as set forth in claim 6 wherein said flexible facing element is glass fiber.

8. The method as set forth in claim 6 and filling an insulating material in the openings between the sides of the web.

9. The method as set forth in claim 6 wherein a porcelain enameled sheet is bonded to the flexible facing element.

10. The method of making a lightweight structural panel in which a fire resistant first facing element is placed in a form with its inside surface upwardly, coating said facing element with a fluid mineral hydraulic cementitious material, immersing a normally stiff reticulated web in a similar fluid cementitious material to coat practically all exposed surfaces of the web, at least some of said fluid cementitious material being absorbed into and penetrating the web, fully opening the normally stiff web as it is absorbed and is softened by the fluid cementitious material, positioning said fully opened web over substantially the entire area of the first facing element, pressing the reticulated, fully opened web against the facing element and forcing the coatings on the web and facing element to merge, applying a similar cementitious material to the inside surface of a second facing element, and pressing said second facing element against the reticulated web while still within the form, and subsequently curing and drying the assembled structural panel.

11. The method as set forth in claim 10 in which said coatings for said facing elements and immersing coating for said web comprise approximately between 84 to 104 pounds of cement, 3/4 to 2 pounds of calcium chloride, and 10 to 13 gallons of water.

12. The method as set forth in claim 11 in which the diameter of the cells of the reticulated web are between 1/4" to 3/4".

13. The method of making a lightweight structural panel in which a facing element is placed in a form with its inside surface upwardly, coating said facing element with a fluid mineral hydraulic cementitious material, immersing a normally stiff reticulated web in a similar fluid cementitious material to coat practically all exposed surfaces of the web, and to make at least some of said fluid cementitious material absorbed into and penetrating the web, fully opening the normally stiff web as it absorbs and is softened by the fluid cementitious material, positioning said fully opened web over substantially the entire area of the facing element, pressing the reticulated, fully opened web against the facing element and forcing the coatings on the cellular structural web and the facing element to merge, applying a similar fluid cementitious material to the inside surface of a second facing element, and pressing said second facing element against the reticulated web while still within the form, and subsequently curing and drying the assembled rigid web and facing elements into a structural panel.

14. The method as set forth in claim 13 wherein said facing elements are paper between .008 calipers and .016 calipers.

15. The method as set forth in claim 14 and filling the cells formed by said rigid cellular structural web with insulating material.

16. The method as set forth in claim 13 wherein said facing elements are fire resistant asbestos panels.

17. The method as set forth in claim 13 wherein said facing elements are formed of gypsum board.

18. The method as set forth in claim 13 wherein said fluid mineral hydraulic cementitious material is gypsum plaster.

19. The method as set forth in claim 13 wherein said fluid mineral hydraulic cementitious material is mineral cement.

20. The method as set forth in claim 13 wherein said fluid mineral hydraulic cementitious material is magnesite.

References Cited in the file of this patent

UNITED STATES PATENTS

| | | |
|---|---|---|
| 1,158,667 | Fairchild | Nov. 2, 1915 |
| 1,749,159 | Respess | Mar. 4, 1930 |
| 1,984,653 | Palmer et al. | Dec. 18, 1934 |
| 2,140,709 | Mauser | Dec. 20, 1938 |
| 2,173,815 | Slisz et al. | Sept. 19, 1939 |
| 2,229,743 | Karcher | Jan. 28, 1941 |
| 2,405,527 | Skolnik | Aug. 6, 1946 |
| 2,428,979 | May | Oct. 14, 1947 |
| 2,434,465 | Marc | Jan. 13, 1948 |
| 2,556,011 | Swayze et al. | June 5, 1951 |
| 2,608,500 | Del Mar et al. | Aug. 26, 1952 |
| 2,669,860 | Bell | Feb. 23, 1954 |
| 2,700,634 | Ackerlind | Jan. 25, 1955 |
| 2,911,076 | Saunders et al. | Nov. 3, 1959 |

FOREIGN PATENTS

| | | |
|---|---|---|
| 723,621 | Great Britain | Feb. 9, 1955 |
| 747,178 | Great Britain | Mar. 28, 1956 |